(12) United States Patent
Heredia et al.

(10) Patent No.: US 6,327,972 B2
(45) Date of Patent: *Dec. 11, 2001

(54) PRINTER WITH A DEVICE FOR THE DRIVING OF TRANSPONDER CHIPS

(75) Inventors: Miguel Heredia, Speyer (DE); David Robson, East Sussex (GB); Peter Schneider, Neckargemünd (DE)

(73) Assignee: Meto International GmbH, Hirschhorn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,239

(22) Filed: Oct. 7, 1999

(30) Foreign Application Priority Data

Oct. 7, 1998 (DE) ............................................. 198 46 295

(51) Int. Cl.[7] .............................. B41F 17/00; B41J 21/17
(52) U.S. Cl. ................................. 101/35; 400/61; 400/70; 400/76
(58) Field of Search ............................... 400/103, 70, 76, 400/61; 101/35

(56) References Cited

U.S. PATENT DOCUMENTS

| | | | | |
|---|---|---|---|---|
| 5,608,417 | * | 3/1997 | De Vall | 343/895 |
| 5,742,618 | * | 4/1998 | Lowe | 371/36 |
| 5,923,251 | * | 12/1999 | Raimbault et al | 340/572 |
| 5,966,404 | * | 10/1999 | Yokota et al. | 375/219 |
| 6,008,727 | * | 12/1999 | Want et al. | 340/572.1 |
| 6,025,725 | * | 2/2000 | Gershenfeld et al. | 324/652 |

FOREIGN PATENT DOCUMENTS 4-350016 * 12/1992 (JP) .

OTHER PUBLICATIONS

PCT Publication No. WO 98/52762, entire reference, Nov. 1998.*

* cited by examiner

Primary Examiner—John S. Hilten
Assistant Examiner—Charles H. Nolan, Jr.
(74) Attorney, Agent, or Firm—Jones, Tullar & Cooper, P.C.

(57) ABSTRACT

The present invention is directed to a printer having a device for printing a data carrier. It is proposed providing the data carrier with at least one transponder chip and equipping the printer with a device for driving the transponder chip. This makes it possible to print the data carrier simultaneously or sequentially and to write data into, or read data out of, the transponder chip.

17 Claims, 3 Drawing Sheets

PRINTER WITH A DEVICE FOR THE DRIVING OF TRANSPONDER CHIPS

FIELD OF THE INVENTION

This invention relates to a printer with a device for printing a data carrier containing at least one transponder chip.

BACKGROUND OF THE INVENTION

Printers for printing data carriers are known in the art. Also known are transponder chips for the electronic storage of data, in particular product information, whose integration in data carriers—particularly labels—is desirable. To date it has been necessary, however, to print such data carriers separately and to have the information written into or read out of the transponders directly afterwards or else beforehand. Two separate steps are thus needed, costing time and hence making the product more expensive.

SUMMARY OF THE INVENTION

It is an object of the present invention both to print a data carrier containing integrated transponder chips and to drive the transponder chips to read or write data in a quick and easy manner.

According to the present invention this object is accomplished in the case of a printer having a device for printing a data carrier containing at least one transponder chip by means of a device for driving the transponder chip.

The essence of the present invention is to equip a printer known in the art with a device for driving the transponder chip. It is thus possible to perform both the printing of the data carrier and the driving of the transponder chip in a single process step.

The advantages of the present invention lie mainly in the saving of time because the operations of printing and driving the transponder chip take place simultaneously (or in quick succession). If printed data and data written into the transponder chip are linked the result is a significant simplification because there is no need to scan the printed image prior to writing data into the transponder chip and no need to read the transponder chip prior to printing.

The data carrier is preferably a label strip, and the transponder chips are integrated in the labels. In this case the label is understood in particular to be a self-adhesive label which is adhered to a supporting web, for example, or else a label without any adhesive layer designed to be used as a tag.

The device for printing the data carrier can be of any type without departing from the spirit and scope of the present invention. For example, it can be a thermal print head or an ink-jet print head.

As a rule the printer has a control circuit (in particular a microprocessor) to control the device for printing the data carrier. This control circuit is configured preferably to also control the device for driving the transponder chip. The advantage lies on the one hand in the unproblematic synchronization of the operations of printing the data carrier and driving the transponder chip. On the other hand it is possible to use a common data source, meaning that one part of the data to be output onto a data carrier is printed—e.g., as bar codes or readable characters—and another part is written into the transponder chip.

The data to be output onto the transponder chip can be treated as an additional data field of a label definition (i.e., the data defining a printed label), meaning that it can be transmitted to the printer from a data source (computer) together with the data to be printed. Hence the definition of data to be output onto a data carrier can be as follows, for example:

bar code (size, position, data);
text (size, position, data);
transponder data (data).

With such a definition, a bar code of the defined size is printed in the defined position on the data carrier, with the data presented as bar codes. Similarly, text of the defined size is printed in the defined position on the data carrier, with the data taking the form of readable plain text. The transponder data, by contrast, is written into the transponder chip.

In an alternative operating mode the computer transmits the transponder data in a so-called bypass mode directly to the device for driving the transponder chip. In this mode the transponder data is not embedded in the definition of the data to be printed out but is transmitted separately from the computer to the printer. On the hardware side the transmission is identical in both operating modes, namely from the computer via the control circuit of the printer to the device for driving the transponder chip, but on the software side there is a difference essentially in the transmission protocol for the transmission of data from the computer to the printer and in the processing of the transponder data by the control circuit of the printer. The printer can be designed to be switched between the two above described modes or to work in one mode only.

The device for driving the transponder chip may be suitable for writing data into the transponder chip and/or for reading data out of the transponder chip. It can be configured, in addition or alternatively, to test the function of the transponder chip. This can be done in particular by writing in and reading out data and then comparing the read data with the written data. A data carrier assigned to a transponder chip that has not passed a function test is then preferably identified as useless, i.e., is colored black, for example, or marked accordingly as "defective" or the like.

There are various possibilities as to where to position the device for driving the transponder chip without departing from the spirit and scope of the present invention.

The device can be positioned downstream from the device for printing the data carrier in relation to a feed direction of the data carrier. Then it may be necessary to configure the printer so that it can reverse the data carrier against the feed direction in order to mark as useless any data carrier which is assigned to a transponder chip that has not passed a function test. In this case it is expedient to print and write the data of the data carrier having the defective transponder chip onto another data carrier. With a device for driving the transponder chip arranged downstream from the printing device, the control circuit of the device for printing the data carrier requires a device for storing the data to be written into a transponder chip because the operations of printing the data carrier and driving the transponder chip are performed with a time delay.

In an alternative approach the device for driving the transponder chip is arranged upstream from the device for printing the data carrier in relation to the feed direction of the data carrier, or it is positioned in such close proximity to the print head as to interact with a transponder chip assigned to a data carrier being printed by the device for printing the data carrier.

Furthermore it is proposed to connect the control circuit of the printer with an interface and to connect the device for driving the transponder chip to this interface. The advantage lies in particular in the ability to retrofit the device for driving the transponder chip on a printer equipped with a suitable interface.

As a rule, the device for driving the transponder chip is comprised of an antenna and a control unit to control the antenna. The control unit can be connected to the above mentioned interface, in particular by way of a card. The card provides preferably a serial or parallel interface to which the control unit is connected.

If the printer is configured to read data from the transponder chip it is possible in particular to read serial numbers saved in the transponder chips by the manufacturer and to transmit them to a computer. It is thus possible to save the serial number from the transponder chip on a different data carrier and/or to print it in legible form on the label.

Finally it should be noted that transponder chips are available from various manufacturers who use different protocols for reading and writing. It is therefore proposed configuring the printer to drive the transponder chip having a protocol selected from several different protocols. However it will be appreciated that a printer with only one, fixed protocol is also possible.

BRIEF DESCRIPTION OF THE DRAWINGS

An embodiment of the present invention will be described in more detail in the following with reference to the accompanying drawing. In the drawing showing schematic representations.

DESCRIPTION OF THE PRIOR ART

Figure 1:
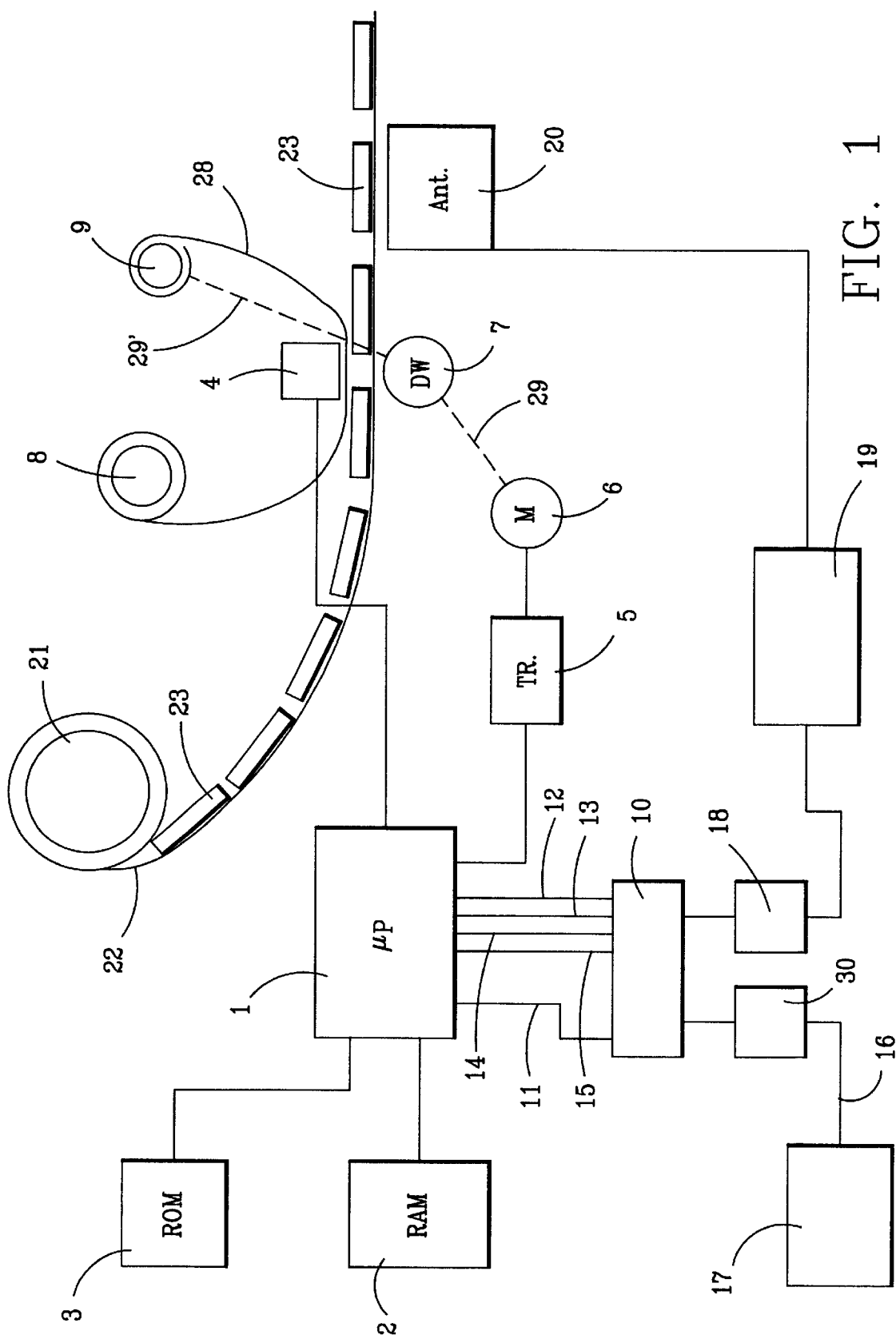
FIG. 1 is a view of a printer for printing labels and having a device for driving transponder chips integrated in the labels.

FIG. 1 is a block diagram showing the schematic representation of a printer of the present invention. In its basic design the printer includes a control system comprising a microprocessor 1 having connected to it a read-write memory (RAM) 2 into which data can be written, a non-volatile memory (ROM) 3, a universal interface 10 and a driver 5 for a motor 6, as well as a number of mechanical parts needed to print labels and described in further detail below.

A strip of labels to be printed is wound on a supply reel 21. The strip is comprised of a siliconized supporting web 22 to which labels 23 are detachably adhered. The label strip is unwound from the supply reel 21 and guided between a platen roll 7 and a print head 4. Furthermore, an ink ribbon 28 is unwound from a supply reel 8 and wound onto a take-up reel 9, the ribbon being guided as this occurs between the print head 4 and the label strip. The print head 4 is a thermal print head having a row of separately activatable heating elements which upon activation cause the ink of the ink ribbon 28 to melt and be transferred to the surface of a label 23 to be printed, thus printing the label. The platen roll 7 is connected by way of a drive link 29 to the motor 6 and, by rotating, pushes the label strip and the ink ribbon 28 through the printing zone defined by the print head 4 and the platen roll 7. The take-up reel 9 is powered by the motor 6 acting via a drive link 29' (indicated by a broken line), which like the drive link 29 between the motor 6 and the platen roll 7 can be implemented in particular by a gear or belt drive. Suitable mechanisms are described in the printed specifications of European Patents EP 645248 A, EP 645253 A, EP 645256 A, EP 646469 A and EP 728590 A, whose contents are incorporated herein by reference.

The print head 4 and the motor 6 are controlled in a know manner by known means. Programs for controlling the printer are stored in the ROM 3, and the data to be printed is stored in bitmap form in the RAM 2 or is generated by the microprocessor 1 using conversion routines during the printing. The interface 10 is described in further detail in European Patent EP 645733 A. The microprocessor is connected to the interface 10 by way of four conductors 12, 13, 14, 15 and a bus 11. The bus is used to transmit data words from the interface 10 to the microprocessor 1 and vice versa, and the conductors have the job of defining the operating mode of the interface 10. While the conductor 12 is set to a logic 1 when data is being written into a first card connected to the interface 10, the conductor 13 is set to a logic 1 when data is being read from the first card connected to the interface 10. Similarly, the conductor 14 is set to a logic 1 when data is being written into a second card connected to the interface 10, and the conductor 15 is set to a logic 1 when data is being read from the second card connected to the interface 10. In this embodiment the first card is a card 30 for connecting a computer (host) 17 which serves as the source of the data to be printed and is connected to the card 30 by way of a conductor 16. The microprocessor 1 is thus configured to receive data from and send data to the external computer 17 via the interface 10 and the card 30.

The microprocessor controls the print head 4 and the motor 6 so that desired images can be printed onto the labels 23. The motor can be a direct current motor or a stepping motor. In the latter case the driver 5 is operable as in European Patent EP 645249 A, meaning that a defined number of control pulses are emitted to the motor 6 in response to a trigger pulse from the microprocessor 1. A suitable control circuit for the print head 4 is also described in European Patent EP 645249 A.

Figure 2:
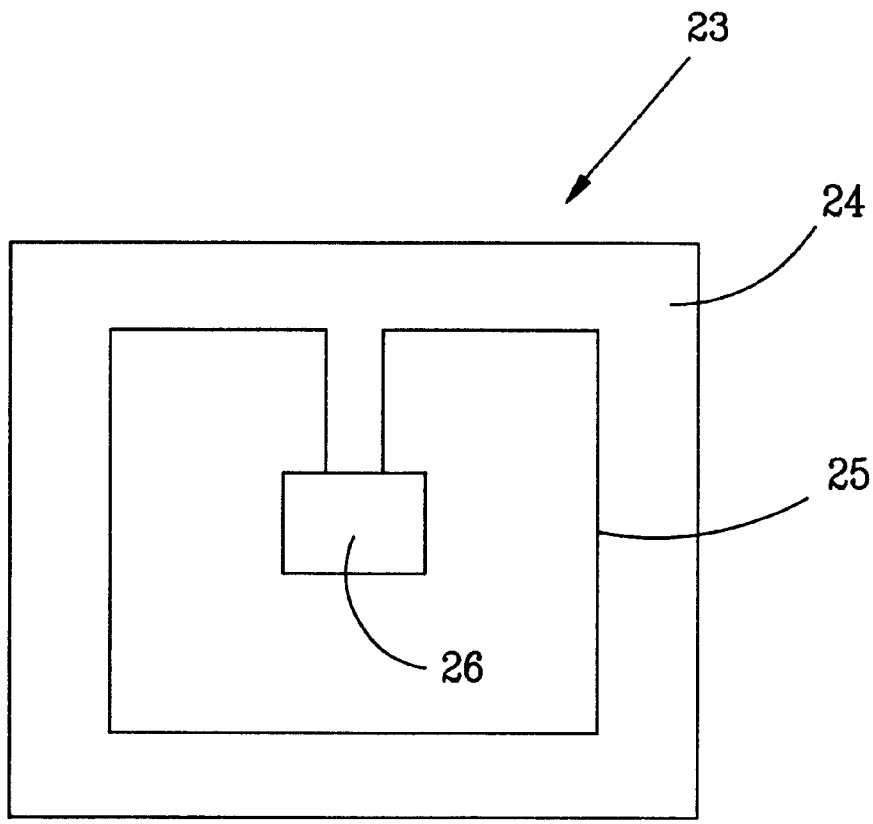
FIG. 2 is a horizontal sectional view of a label equipped with a transponder chip.
Figure 3:
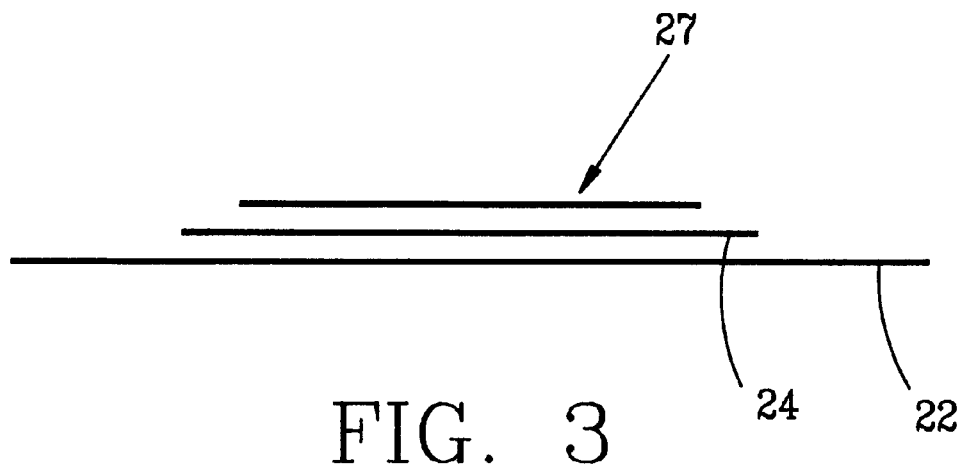
FIG. 3 is a vertical sectional view of a label equipped with a transponder chip.

From the section through the label 23 shown in FIG. 2, which is taken in the plane of the label, it becomes apparent that the label contains an integrated antenna 25 and a transponder chip 26 connected to the antenna. The antenna 25 and the transponder chip 26 are adhered to a substrate 24 arranged in sandwich fashion between an overlayer 27 and the supporting web 22, as becomes apparent from the vertical section of FIG. 3. In this arrangement the transponder chip 26 and the antenna 25 face the overlayer 27, and the bottom side of the supporting web 24 shown in FIG. 3 is coated with adhesive in order to be able to affix the label 23 to an object. The overlayer 27 can be printed with any information by the printer shown in FIG. 1.

In order also to be able, during printing of the labels 23, to write data into the transponder chips 26 integrated in the labels 23 or to read the data from the transponder chips 26 or to test the function of the transponder chips 26 so as to use this data to control the printer (particularly information printed on the label), for example, the printer shown in FIG. 1 is equipped with an antenna 20 configured to interact with at least one transponder chip 26 of a label 23 or with several transponder chips which may be assigned to one label or several labels. The antenna is connected to a control unit 19 which in turn is connected to the interface 10 by way of a card 18. The card 18 is the second card described above. The control unit 19 includes a control circuit for controlling the antenna 20 and enables data to be read in and out of a transponder chip 26 interacting with the antenna 20 as well as the transmission of this data from and to the card 18. The microprocessor 1 is thus configured to transmit data in serial or parallel form via the card 18 to the control unit 19 when the conductor 14 is set to a logic 1, and the control unit 19 transmits this data by way of the antenna 20 to the transponder chip 26 interacting with the antenna 20. Similarly the microprocessor 1 is configured to receive data from the control unit 19 by way of the card 18 when the conductor 15 is set to a logic 1. In response to a corresponding query signal the control unit 19 receives this data by way of the antenna 20 from the transponder chip 26 interacting with it. In summary, the microprocessor of the printer is thus configured to write data into, and to read data from, a transponder chip 26. The card 18 provides a serial (alternatively: parallel) interface to which the control unit 19 is connected. In the embodiment shown, the second label interacts downstream from the print head 4 with the antenna 20.

Suitable transponder chips and query methods are described in the printed specifications EP 301127 A, EP 440040 A, EP 494764 A, EP 496609 A, EP 496610 A, EP 496611 A, EP 537378 A, EP 549832 A, EP 568066 A, EP 600374 A, EP 615136 A, EP 625714 A, EP 632288 A, EP 657836 A, EP 766215 A, EP 768540 A, EP 837412 A and EP 845751 A, whose contents are incorporated herein by reference.

By suitable control of the microprocessor (by way of corresponding programs stored in the RAM 2 and/or ROM 3) the printer is thus configured to print a label 23 and (subsequently) to write data into the transponder chip 26 of the label. The required delay between printing and writing the data, which on account of the mechanical positioning of the antenna 20 proves necessary in the embodiment shown because the next label 23 is already being printed when the data is being written into the transponder chip 26, is easy to implement by suitable programming of the microprocessor 1 (i.e., interim storage of the data for the transponder chip).

It will be appreciated that it would also be possible to arrange the antenna 20 in such a way that it always interacts with the label 23 currently interacting with the print head 4, in other words to arrange it in the direct vicinity of the print head 4. There would then be no need for a delay between the printing operation and the driving of the transponder, but it would be necessary to overcome a number of difficulties caused by the high-frequency query signals such as shielding of the antenna by the print head or platen roll and unwanted radiation from the antenna into the print head, etc.

The antenna 20 could also be arranged upstream from the print head 4 so that the transponder chips 26 are written and/or read prior to printing. In this case it would be possible to use an information item stored in the transponder chips 26 for printing on the labels, e.g., a serial number to be printed.

Furthermore, it would be possible to test the function of the transponder chips 26 prior to printing, enabling labels 23 with faulty transponder chips 26 to be identified by the print head as useless, e.g., by coloring them black. In the embodiment shown in FIG. 1, where driving of the transponder chips 26 takes place after printing, it is similarly possible for the function of the transponder chips 26 to be tested by the microprocessor 1, the control unit 19 and the antenna 20 instead of (or in addition to) writing data into the transponder chips 26 as previously described. For this purpose, (test) data is written into the transponder chips 26 and then read out. If the read data fails to match the written data, the transponder chip 26 is defective. In this case an approach presenting itself involves reversing the label strip so that the label with the defective transponder chip 26 comes to lie beneath the print head 4 to be marked as useless (colored black). Reversing the label strip requires the direction of rotation of the platen roll 7 to be reversed and/or the print head 4 to be lifted from the platen roll 7, as well as a separate drive mechanism for the label strip which may take the form of a pair of rolls, for example. At the same time the take-up reel 9 for the ink ribbon 28 can be locked in place. A mechanism suitable for the reversing of labels is described in European Patents EP 645248 A and EP 645253 A, whose contents are incorporated herein by reference. An advantage of testing the transponder chips 26 after printing is that the chips have then been exposed already to heat and pressure loading by the print head 4, as a result of which any transponder chips 26 which are not fully in order will be defective with greater certainty than prior to printing.

For an arrangement of the antenna 20 downstream from the print head 4 as shown in FIG. 2, a preferred method for controlling the printer is for the antenna to interact with a printed transponder chip (in FIG. 1 the antenna would therefore need to be relocated to the left in the direction of the platen roll 7), and for the control system of the printer to monitor, by means of the antenna 20 and the control unit 19, whether a label 23 with a transponder chip 26 has entered the range of action of the antenna 20. If the result is positive, the time required to program the transponder chip 26 is computed. This time depends in particular on the volume of data to be written in and/or read out. A computation is also carried out to determine the length of the label 23 over which driving of the transponder chip 26 by the antenna 20 is possible. This length depends on the dimensions of the antenna 20, its distance from the label strip, and the dimensions of the antenna 25 of the label 23. The printing and hence feed speed of the label strip is established from the computed time and length over which driving is possible. This speed is selected as high as possible but in particular just high enough for the trailing edge of the label to remain underneath the print head 4 after the data is written and read so as to be able to mark the label as useless, meaning to print it accordingly, if there is a fault (the read and written data do not match). Hence the printing speed is selected as high as possible but only high enough to enable the label to be marked as useless without reversing the label strip.

Figure 4A:
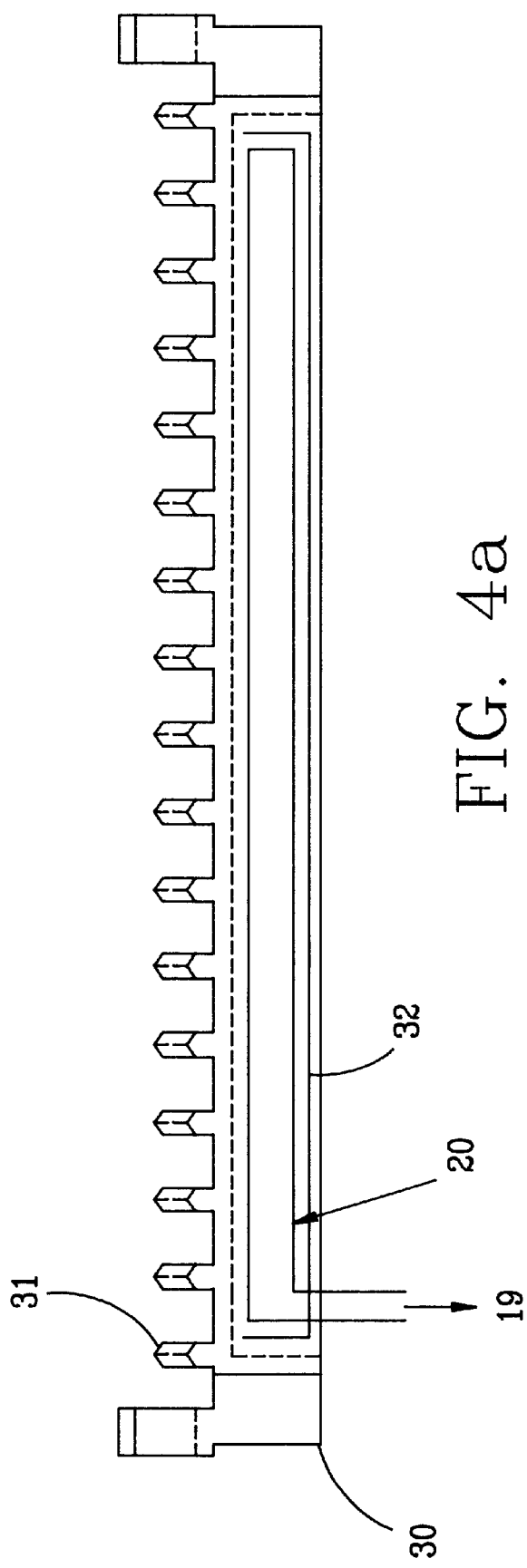
FIG. 4a is a sectional view of a holder for an antenna.
Figure 4B:
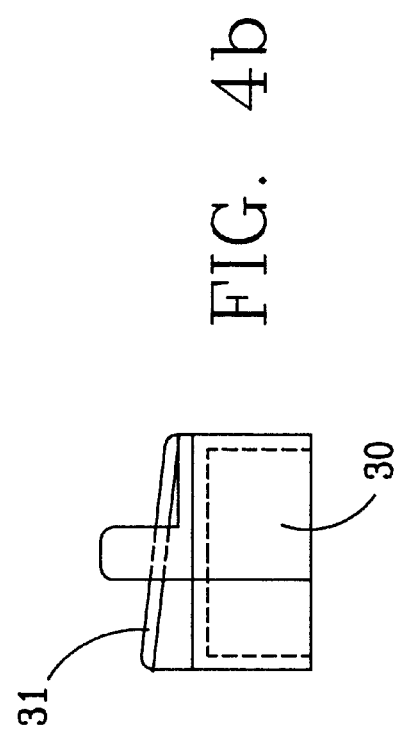
FIG. 4b is a side view of an antenna.

FIG. 4a shows a section through a holder 30 with an antenna 20 inside. The antenna 20 extends across the full width of a data carrier having the maximum width usable in the printer. Alternatively, the use of a narrower antenna placed if necessary a greater distance from the data carrier and/or designed to be adjusted across the width of the data carrier could also be contemplated. On its lower side facing away from the data carrier the antenna 20 is equipped with a metal shield 32 in order to protect the electronics inside the printer from undesirable radiation. Consequently the printer requires only a single antenna for all sizes of label, and there is no need to make any adjustments to the position of the antenna when changing the data carrier format. The antenna can be used in all the printer's operating modes, namely during the continuous consecutive printing of a label strip as well as when printing and dispensing single labels. The antenna 20 is fitted in a plastic holder 30 provided with ribs 31 on its top side facing the data carrier. In other embodiments in which no self-adhesive labels are processed it is possible to do without the ribs. The holder is fitted preferably to the outside of the printer case. A dispensing lip at which the labels 23 are delaminated from their supporting web 22 is usually fitted inside the printer case (and hence upstream from the antenna 20), so the ribs 31 prevent the labels 23 with their adhesive-coated backs from sticking to the holder. The holder 30 can be detachably mounted on the printer case, similar to the label support described in German Patent DE 19513140 A. FIG. 4b shows a side view of the holder 30.

The final outcome is a printer which by simple means enables the printing of a data carrier and the driving of transponder chips contained therein.

What is claimed is:

1. A printer for printing on a data carrier having at least one transponder chip therein, including: a device for printing the data onto said data carrier; a device for driving the transponder chip; an interface; and a card, wherein:
    said device for driving the transponder chip comprises an antenna and a control unit to control said antenna;
    said control unit is connected to said interface via said card;
    said transponder chip is configured to read a serial number and to transmit the serial number data read to a computer;
    said control circuit establishes the printing speed as a function of the time required for programming said transponder chip and as a function of feed of said data carrier over which driving of a printed transponder chip by said antenna is possible; and
    said device for printing the data onto said data carrier includes a printing head, said carrier is a label strip which defines a trailing edge, and the printing speed is selected to enable said trailing edge to remain beneath said printing head after the data is written and read.

2. The printer as defined in claim 1, wherein said data carrier is a label strip, and wherein said transponder chip on each label strip is integrated therein.

3. The printer as defined in claim 1, wherein said device for printing the data onto said data carrier is one of: a thermal print head and an ink-jet printed head.

4. The printer as defined in claim 1, further including: a control circuit for driving said device for printing the data onto said data carrier and for driving said transponder chip.

5. The printer as defined in claim 4, wherein said control circuit comprises a microprocessor.

6. The printer as defined in claim 1, wherein said device for driving said transponder chip writes data into said transponder chip and/or reads data out of said transponder chip.

7. The printer as defined in claim 6, wherein the data to be output onto said transponder chip is transmitted to the printer from a data source as an additional field of data defining a printed data carrier.

8. The printer as defined in claim 6, wherein the transponder data is transmitted separately from a data source to the printer.

9. The printer as defined in claim 1, wherein said device for driving the transponder chip is configured to test the function of the transponder chip by writing in and reading out data and comparing the read data with the written data.

10. The printer as defined in claim 9, wherein any one of said transponder chips that has not passed a function test is identified as useless.

11. The printer as defined in claim 1, wherein the data carrier defines a feed direction, and wherein said device for driving the transponder chip is arranged downstream from said device for printing the data onto said data carrier relative to said feed direction.

12. The printer as defined in claim 1, wherein said device for driving the transponder chip is arranged to interact with the transponder chip of a data carrier being printed by said device for printing on a data carrier.

13. The printer as defined in claim 4, further including: an interface, said interface being connected to said control circuit and to said device for driving the transponder chip.

14. The printer as defined in claim 1, wherein said card provides one of: a serial and a parallel interface to which said control unit is connected.

15. The printer as defined in claim 1, wherein the protocol used for driving said transponder chip is selected from a plurality of different protocols.

16. The printer as defined in claim 1, wherein said antenna extends across the maximum possible width of said data carrier.

17. The printer as defined in claim 1, wherein said antenna is equipped with a metal shield on its side facing away from said data carrier.

* * * * *